United States Patent [19]

Skanberg et al.

[11] Patent Number: 5,582,425
[45] Date of Patent: Dec. 10, 1996

[54] GAS SUPPLY DEVICE FOR AN AIR-BAG

[75] Inventors: Torbjorn Skanberg, Hovas; Lennart Karlsson, Alingsas, both of Sweden

[73] Assignee: Autoliv Development AB, Vargarda, Sweden

[21] Appl. No.: 495,614

[22] PCT Filed: Feb. 8, 1994

[86] PCT No.: PCT/SE94/00096

§ 371 Date: Oct. 18, 1995

§ 102(e) Date: Oct. 18, 1995

[87] PCT Pub. No.: WO94/18034

PCT Pub. Date: Aug. 18, 1994

[30] Foreign Application Priority Data

Feb. 8, 1993 [GB] United Kingdom .................. 9302430
May 12, 1993 [GB] United Kingdom .................. 9309803

[51] Int. Cl.$^6$ ...................................................... B60R 21/26
[52] U.S. Cl. ............................ 280/736; 280/741; 280/742
[58] Field of Search .................................... 280/736, 741, 280/742, 728.1; 102/530, 531; 222/3, 5; 422/164–167

[56] References Cited

U.S. PATENT DOCUMENTS

| | | | |
|---|---|---|---|
| 4,021,058 | 5/1977 | Suzuki et al. | 280/737 |
| 4,919,897 | 4/1990 | Bandor et al. | 422/165 |
| 5,219,178 | 6/1993 | Kobari et al. | 280/736 |
| 5,360,232 | 11/1994 | Lowe et al. | 280/741 |
| 5,415,845 | 5/1995 | Brede et al. | 280/736 X |
| 5,439,250 | 8/1995 | Kokejuchi et al. | 280/736 |

FOREIGN PATENT DOCUMENTS

| | | |
|---|---|---|
| 2121389 | 11/1971 | Germany . |
| 2339618 | 2/1974 | Germany . |
| 2265376 | 10/1979 | Germany . |
| 4002662 | 8/1991 | Germany . |
| 4106716 | 9/1992 | Germany . |

*Primary Examiner*—Christopher P. Ellis
*Attorney, Agent, or Firm*—Spencer & Frank

[57] ABSTRACT

A gas supply device for supplying gas to an air-bag comprises a bottle containing compressed gas. The bottle is provided with a valve mechanism which operates to pen in a controlled way a flow passage for the compressed gas. The valve mechanism operates in response to a change in pressure in a region within the bottle. The valve mechanism comprises two valve members each with a tubular portion terminating with an inwardly turned lip directed towards a tubular member. The valve members are initially retained by frangible solder sports until a predetermined change of pressure has occurred in the region. The flow passage is defined between the free end of the lip and the exterior of the tubular member. Various grooves or depressions are provided in the outer surface of the tubular member so that the flow passage area for gas increases gradually as the valve is opened. Each tubular portion carries a portion extending across the interior of the bottle to define the region.

18 Claims, 6 Drawing Sheets

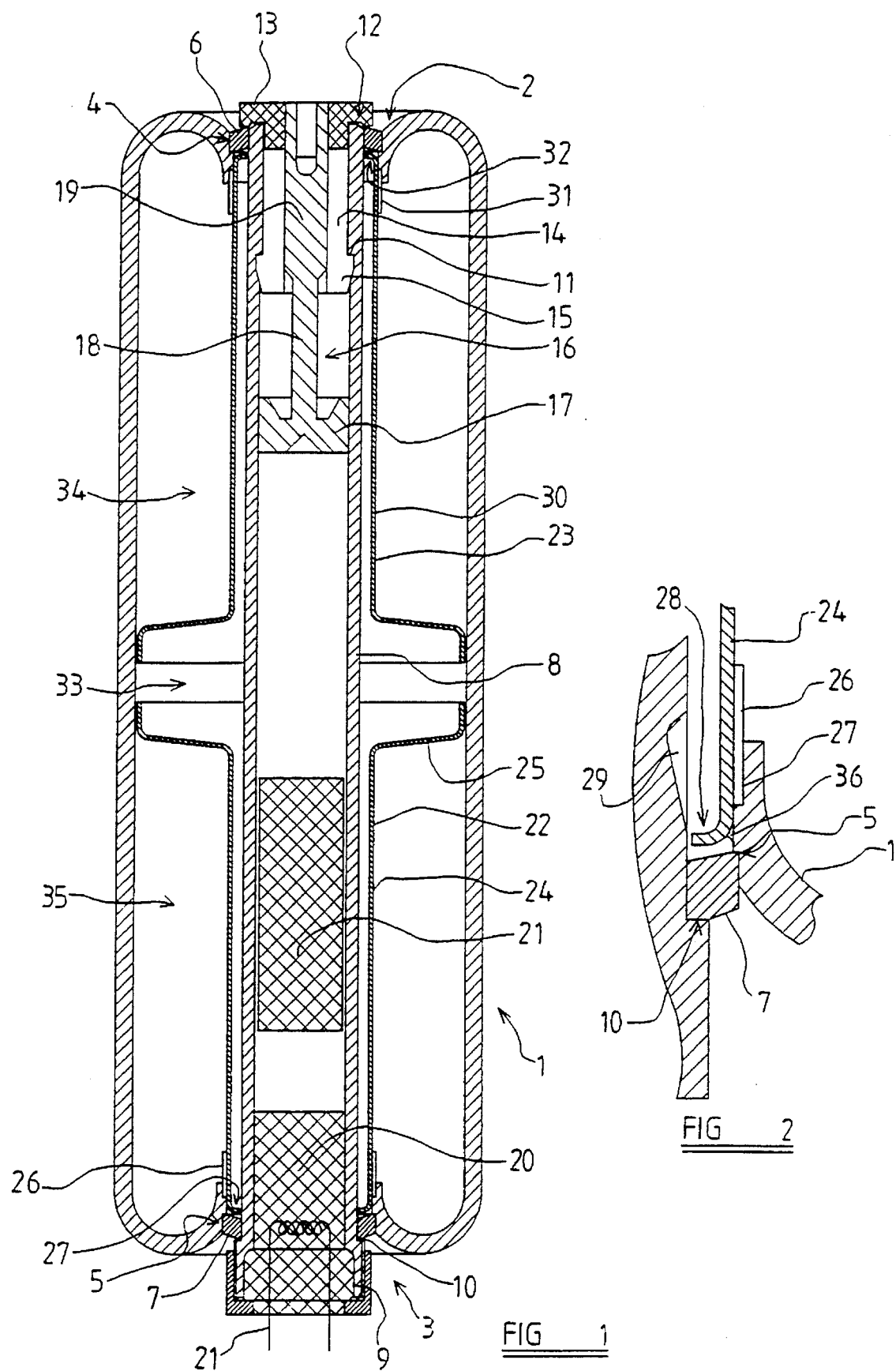

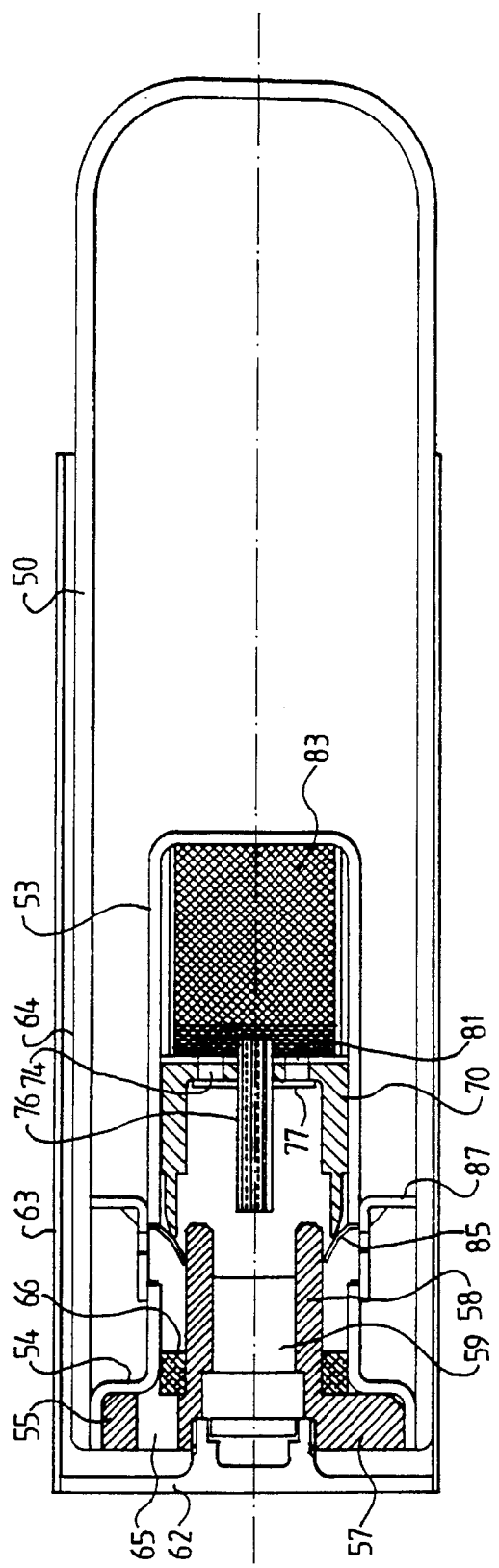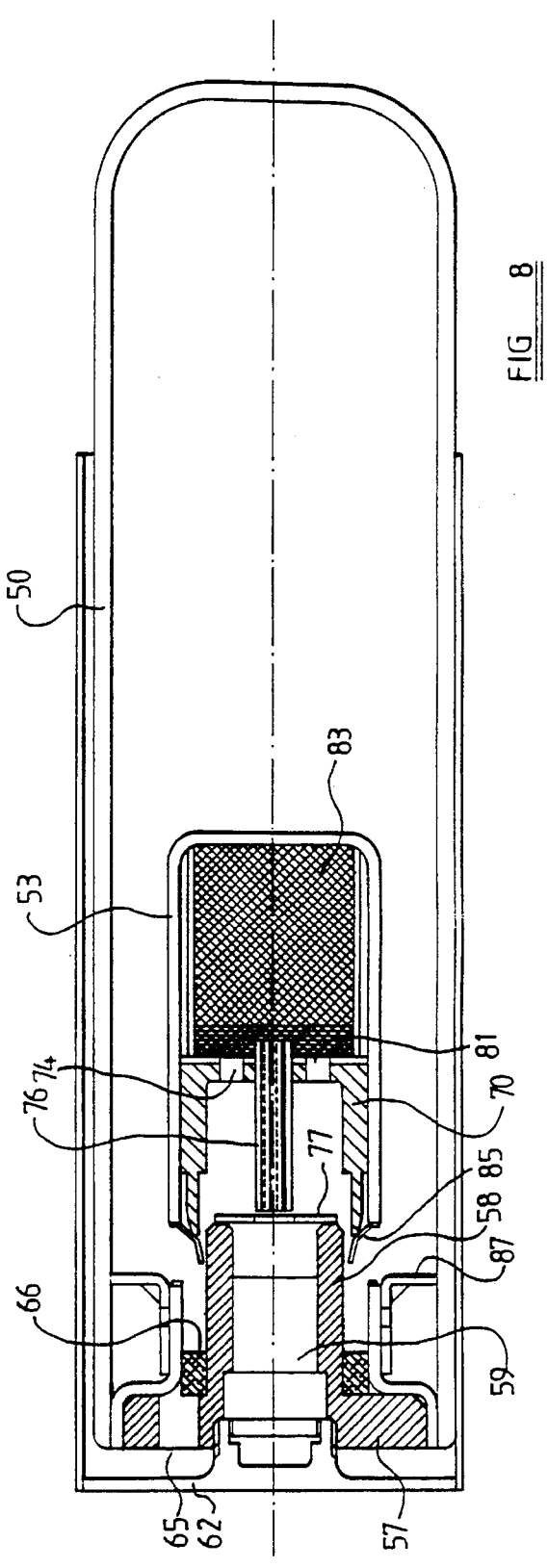

GAS SUPPLY DEVICE FOR AN AIR-BAG

BACKGROUND OF THE INVENTION

It has been proposed to provide one or more air-bags in a motor vehicle, each air-bag being provided with a gas supply adapted to be activated in the event that an accident should occur, the gas inflating the bag to form a cushion to protect the driver of the vehicle or an occupant of the vehicle.

It has been proposed before, see DE-A-4002662, to use compressed air initially contained in a bottle to inflate an air-bag. The bottle is opened by igniting a pyrotechnic charge which serves to separate, from the bottle, a lid which is initially formed integrally with the rest of the bottle, there being a relatively thin break line between the lid and the bottle. An arrangement of this type does not have any problems relating to the initial sealing of the bottle, but a lot of energy is expended in removing the lid from the bottle.

It has also been proposed to use compressed air contained in a bottle which is sealed by a locking element pressed against an outlet port for the bottle. DE-A-2121389 discloses an arrangement of this type. However, the closure element must be pressed very firmly against the outlet port to ensure a totally air-tight seal, and a lot of energy is required to remove the locking element from the sealed position.

One disadvantage in using a system in which compressed air is released from a bottle is that when compressed air is released from a bottle or other receptacle which contains the compressed air, the air tends to cool. It is a well-known law of physics that the volume of a fixed quantity of a gas, such as air, is substantially proportional to its temperature. Thus the cool air does not efficiently inflate the air-bag.

It has also been proposed to utilise a pyrotechnic source of gas to inflate an air-bag. Such a source may also provide problems in that gas from a pyrotechnic source is frequently extremely hot and can thus damage the interior of the air-bag unless special precautions are taken. Also, many of the gases generated by a pyrotechnic source may be toxic or poisonous, especially if present in a significant concentration.

Although, as explained above, the use of a pyrotechnic source is associated with problems, it is to be understood that problems are also associated with the use of compressed air initially contained in a bottle or other receptacle to inflate an air-bag. Typically the pressure of such compressed air can be 400 bar (=40 MPa). When a compressed air-bottle of this type is opened, there is a very high initial flow, that flow itself being at high pressure. This leads to a very high "volume-flow". As, at least initially, the volume of the bag is very small, the part of the bag that is actually inflated by this flow of air, travels at a very high speed. Consequently, a dangerously high momentum is imparted to the bag and to the gas associated with the bag. The part of the bag that has this momentum is the part of the bag that is closest to the person that it is desired to protect, and in some instances, the part of the bag having the high momentum can actually hit or impinge upon the person to be protected by the bag, which can cause unnecessary injuries. It is to be appreciated that as the volume of the bag increases, the pressure within the compressed air-bottle falls, which means that there is then a much lower volume-flow, and since this volume-flow is being introduced into an already considerable volume, the gas-bag only inflates at a relatively slow rate during the final stages of its inflation.

It is most desirable to have an almost opposite characteristic to that described above. The ideal situation would involve a relatively small initial flow of gas, thus causing the bag to begin inflation in a slow and gradual manner, without any part of the bag having a high speed, with the flow-rate increasing when the interior of the bag defines a significant volume, so that the air-bag is fully inflated within an acceptable period of time. It is presently felt that the maximum acceptable period of time for the inflation of an air-bag is 60 milliseconds.

Whilst a pyrotechnic or gas generator provides an almost constant flow of gas over a period of time, thus being a little closer to the desirable characteristic described above, it is to be appreciated that even a pyrotechnical gas generator (which is associated with various problems described above) is not ideal.

SUMMARY OF THE INVENTION

The present invention seeks to provide an improved gas supply device for an air-bag.

According to this invention there is provided a gas supply device for supplying gas to an air-bag, the gas supply device comprising a bottle containing compressed gas and a valve mechanism operable to permit the compressed gas to flow from the bottle to inflate the air-bag, the valve mechanism comprising a valve member which is movable in response to a change in pressure in a specific region within the bottle to increase, in a controlled manner, the flow passage area for gas flowing from the bottle, retaining means being provided to retain the valve member in a first position until the change in pressure reaches a predetermined limit, the retaining means then releasing the valve member to permit the valve member to move.

Preferably the retaining means comprise frangible means, such as solder.

Conveniently the valve member forms a first valve which controls the rate of flow of gas, there being a further valve in series with the first valve, the further valve initially being gas-tight and being openable to initiate the flow of gas from the bottle. In one embodiment the further valve is opened by actuation of a pyrotechnic charge. Alternatively the further valve may be opened by means of an electro-magnetic arrangement.

Advantageously the further valve comprises a sealing means adapted to seal a bottle containing the compressed gas, the sealing means being provided with one or more locking elements each adapted to engage an abutment to retain the sealing means in the sealing position, there being a further locking element, adjacent said at least one locking element, to retain the at least one locking element in position in engagement with the abutment, means being provided to move the further locking element when the device is operated, thus enabling the said one or more locking elements to become disengaged from the abutment to release the sealing means to open the further valve.

Advantageously the bottle or receptacle containing compressed gas defines at least two regions separated by a partition wall, the partition wall being movable in response to a fall in pressure in one of the two regions, the valve member moving in response to movement of the partition wall.

Conveniently the partition wall is formed integrally with the movable valve member. Preferably the bottle or receptacle containing compressed gas defines at least two regions separated by a partition wall, the valve mechanism being such that gas from one of the regions is dispensed before gas from the other region is dispensed.

Advantageously the cross-section of the flow area of the valve when fully opened is approximately twenty times larger than the cross-section of the flow area of the valve when the valve mechanism is initially opened. Preferably the flow passage gradually increases with the movement of the movable valve member.

Conveniently the movable valve member moves past a series of grooves, enabling the grooves to become part of the flow path, thus increasing the cross-sectional area of the flow path.

Preferably the further valve comprises a sealing ring initially retained in position engaging a seat, the valve being opened by removing the sealing ring from the seat.

In one embodiment the movable valve member comprises a tubular portion surrounding a tube, means being provided to constrain gas from the bottle to flow between the tubular portion and the tube, the tubular portion terminating with an inturned lip defining a leaky valve, the tubular portion being received slidingly within a sealing ring and being adapted to be removed from the sealing ring to fully open the valve mechanism.

Preferably the period of time necessary to fully open the valve mechanism has a duration of at least 10 milliseconds, and is conveniently at least approximately 30 milliseconds.

In order that the invention may be more readily understood, and so that further features thereof may be appreciated, the invention will now be described, by way of example, with reference to the accompanying drawings in which

BRIEF DESCRIPTION OF THE DRAWINGS

FIG. 1 is a sectional view illustrating one embodiment of a gas supply arrangement for use with an air-bag, FIG. 2 is part of FIG. 1 on an enlarged scale, FIG. 7 is a view corresponding to FIG. 5 illustrating the embodiment of FIG. 5 shortly after being activated, and FIG. 8 is a view corresponding to FIG. 7 illustrating the gas generator of FIG. 5 a few moments later.

DETAILED DESCRIPTION OF THE INVENTION

Figure 3:
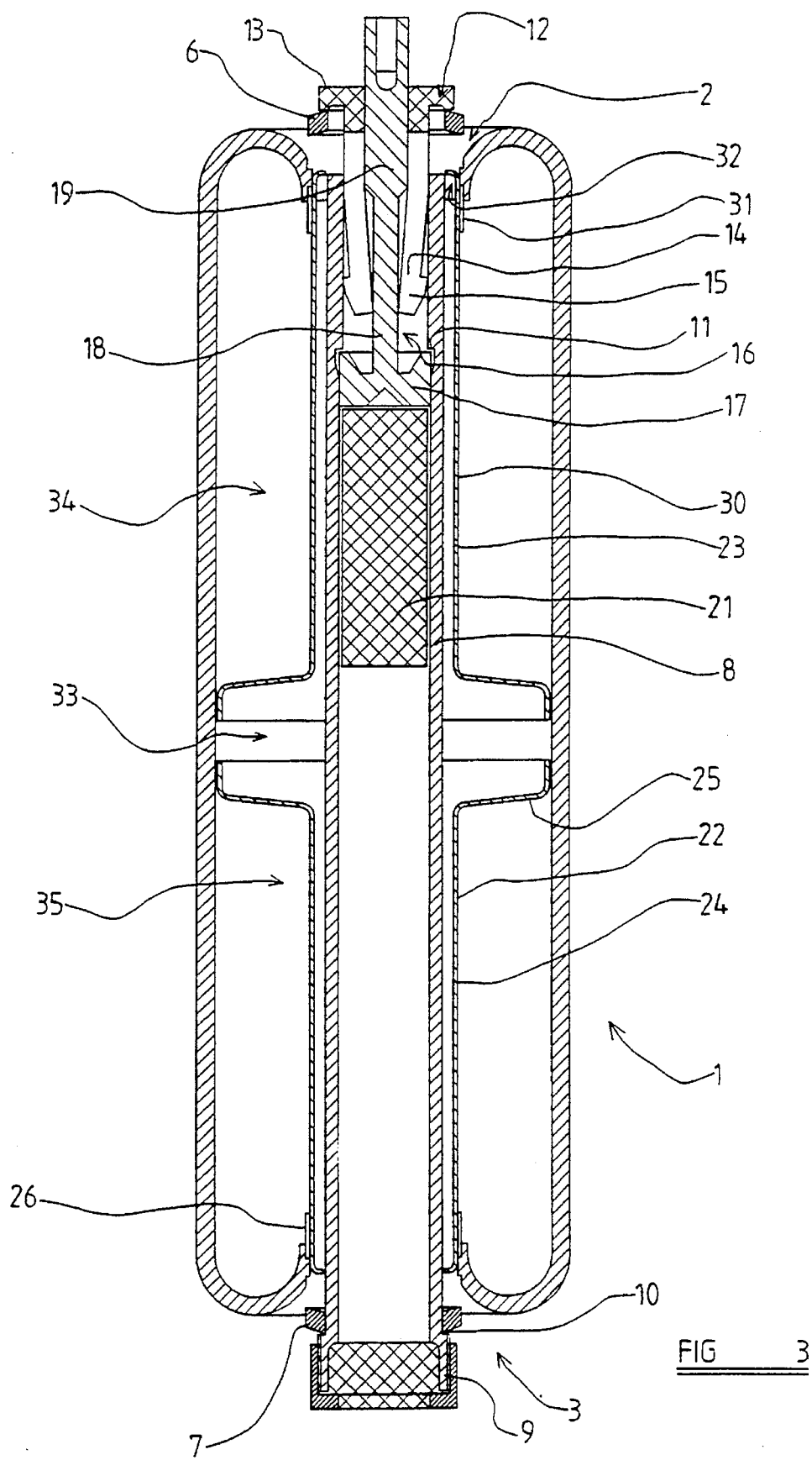
FIG. 3 is a view corresponding to FIG. 1 illustrating the arrangement shortly after the arrangement has been activated.

The particularly described gas supply arrangements for an air-bag include not only a source of compressed gas, such as compressed air, but also a pyrotechnic device.

Referring now to FIGS. 1 to 4 of the drawings, a bottle 1 adapted to contain compressed gas, such as compressed air, comprises a generally cylindrical body having inwardly turned end portions which define two opposed re-entrant openings 2, 3 leading to the interior of the bottle 1. Each of the re-entrant openings 2, 3 defines, on its outer surface, a seat 4, 5 adapted to engage the outer periphery of a respective sealing ring 6, 7.

The sealing rings 6 and 7 serve to seal the bottle to retain compressed air in the bottle, but as will be described in greater detail, the sealing rings 6 and 7 operate as valves to permit compressed air to escape from the bottle under certain circumstances.

A tube 8 is provided which extends through the bottle 1. The tube 8 has an enlarged end 9, the junction between the enlarged end 9 and the main part of the tube 8 defining a seat 10 which engages the sealing ring 7 provided at the lower re-entrant opening 3 in the illustrated orientation of the bottle 1. It is to be understood that the tube 8 is inserted upwardly into the bottle 1 through the lower re-entrant opening 3.

Towards the upper end of the tube 8, the inner wall of the tube 8 is deformed inwardly to form an annular seat or abutment 11.

Partially received within the upper end of the tube 8 is a plug 12. The plug 12 presents a radially outwardly extending flange 13 which engages the end of the tube 8, and also extends radially outwardly beyond the end of the tube 8 to engage the sealing ring 6. The flange carries resilient fingers 14 which extend axially of the tube 8 along the interior of the tube, the fingers 14 carrying enlarged heads 15 which engage the annular seat or abutment 11 with an inclined or chamfered angle of contact. With the enlarged heads 15 of the fingers 14 engaging the seat 11 the radially outwardly directed flange 13 of the plug 12 firmly engages the sealing ring 6, which in turn engages the seat 4, and thus the bottle 1 is substantially air-tight.

A piston 16 is provided which is slidably mounted within the tube 8. The piston 16 has a head 17 which is a loose non-sealing fit within the tube 8. The head 17 is connected, by a relatively narrow shank 18, to a rod 19 which has an outer diameter substantially equal to the spacing between the fingers 14. The rod 19 is located between the fingers 14 and thus serves to retain the enlarged heads 15 in engagement with the seat 11. The piston may be retained in this initial position by some easily frangible means, or by friction between the rod 19 and the flanges 14. It will be appreciated that the presence of the rod 19 acts as a secondary locking element which locks the enlarged heads 15 of the fingers 14, which comprise primary locking elements, in position engaging the seat 11 so that the entire assembly is locked in position, maintaining the bottle 1 in a sealed condition.

At the lower end of the tube 8 a pyrotechnic charge 20 is provided which is illustrated as being associated with an electrical ignition arrangement 21.

Contained within the tube 8, between the pyrotechnic charge 20 and the head 17 of the piston 16 is a second pyrotechnic charge 21.

Two substantially tubular valve members 22, 23 are provided within the bottle 1, the members being mirror-images of each other. Thus only the valve member 22 will be described in detail.

The valve member 22 comprises a substantially cylindrical portion 24 surrounding part of the tube 8. The upper end of the tubular portion 24 extends substantially radially outwardly thus defining a flange or bell 25, the outer diameter of the flange or bell being substantially equal to the inner diameter of the bottle 1. The bell 25 effectively forms a partition extending across the interior of the bottle 1. The lower end of the tubular portion 24 is slidingly and sealingly received within an axially extending sealing ring 26 extending from a seat 27 provided on the re-entrant portion of the bottle 1 forming the lower re-entrant opening 3.

At its lower end, the tubular portion 24 of the valve member 22 is provided with an inwardly turned lip 28 which is thus directed inwardly towards and terminates adjacent the outer part of the tube 8. The lip 28 substantially seals the annular passage between the tube 8 and the re-entrant opening 3 as extended inwardly by the sealing ring 26, and thus acts as a leaky valve as will be described hereinafter.

In the region of the tube 8 which is effectively surrounded by the sealing ring 26 a plurality of axially extending grooves or depressions 29 are provided in the outer surface of the tube 8.

As mentioned above, the tubular valve member 23 is a mirror-image of the valve member 22, and the upper end of the main tubular portion 30 of this valve member is received slidably within a sealing ring 31 which corresponds with the sealing ring 26, and the upper end is provided with an inturned lip 32 corresponding to the lip 28. The grooves corresponding to the grooves 29 may be provided in the tube 8 in the region of the sealing ring 31.

The tubular portion 24 of the valve member 22 (and similarly the tubular portion 30 of the valve member 23) are soldered with spots of solder 36 as shown in FIG. 2 to the bottle 1. The solder comprises breakable or frangible elements which hold the valve members 22, 23 in position until the pressure within the region 33 passes a predetermined threshold or limit. The solder then breaks permitting the valve members to move.

It is to be appreciated that in order to introduce the valve members 22 and 23 into the bottle 1, the bottle 1 may be made of two parts, which are subsequently joined together.

When the gas supply arrangement has been assembled, as illustrated in FIG. 1, the gas bottle 1 may be filled with compressed gas, such as compressed air, by means of appropriate inlet valves provided in the gas bottle 1 (not shown). The gas cannot escape from the gas bottle, since the inlet valves are provided with non-return valves of an appropriate design and the gas cannot escape through the seals formed by the sealing rings 6 and 7.

The entire gas supply arrangement as illustrated in FIG. 1 will be inserted within air-bag adapted to be inflated in the event that an accident arises.

When an accident does occur, and is sensed by the appropriate sensors, the pyrotechnic charge 20 is ignited by the electrical ignition arrangement 21. The charge 20 swiftly produces a large quantity of gas. This gas initially serves to move the second pyrotechnic charge 21 axially along the tube 8 and also causes a significant increase of pressure in the region in front of the head 17 of the piston 16. Even though some gas flows past the piston because of its loose non-sealing fit, sufficient pressure is applied to the head 17 of the piston 16 to cause the piston to move axially of the tube 8, in an upward sense if the gas bottle is in the orientation shown in FIG. 1.

As the piston moves upwardly, so the rod 19 is moved upwardly, then extending beyond the end of the plug 12, the relatively narrow shank 18 then being located adjacent the fingers 14. When the relatively narrow shank 18 is in this position, the force applied to the flange 13 on the plug through the seal 6 by the compressed gas within the bottle 1 applies a force tending to move the plug 12 upwardly. Due to the chamfered angle of contact between the seat 11 and the enlarged head 15 of each of the resilient fingers 14, the enlarged head of each resilient finger 14 moves inwardly, thus enabling the plug 12 to be moved upwardly, axially of the tube 8. Once the plug has moved in this way, the sealing ring 6 becomes totally disengaged from the seat 4, since the sealing ring 6 is no longer retained in position by the flange 13. The valve defined by the sealing ring 6 is thus opened.

Compressed gas from the bottle 1 can thus begin to escape through the opening 2.

The only path for gas escaping from the bottle through the opening 2 is between the tubular portion 30 of the valve member 23 and the tube 8. Thus the gas must pass the valve defined by the inturned lip 32 provided at the upper end of the tubular member 30, which valve is effectively in series with the valve constituted by the ring 6. Because the inturned lip 32 is spaced from the exterior of the tube 8 the valve is a "leaky" valve, permitting a predetermined controlled flow of compressed gas. The rate of flow is relatively small.

It is to be understood that once the flange 13 no longer engages the sealing ring 6 and the end of the tube 8, pressure applied to the sealing ring 7 by compressed gas present within the bottle i tends to move the sealing ring 7 and the whole tube 8 axially downwardly, when the bottle is in the orientation illustrated in FIG. 1. Thus the seal defined by the sealing ring 7 is broken, or in other words the valve constituted by the sealing ring 7 is opened and gas may also begin to escape through the lower re-entrant opening 3. This gas escapes by passing the inturned lip 28 provided at the lower end of the tubular portion 24, this lip forming another "leaky" valve.

The small flow of gas will inflate an associated air-bag slowly, as is desired.

However, all the gas that is escaping from the bottle is effectively drawn from the region 33 located between the bell 25 of the valve member 22 and the opposed corresponding bell 25 of the valve member 23. The gas passes between the tubular portions 24, 30 and the tube 8 to escape through the leaky valves. As compressed gas is withdrawn from the region 33, the pressure in this region falls, and a pressure differential is established across the partition defined by the bell of the valve member 23. The higher pressure gas in the region 34, that is to say the region between the bell of the valve member 23 and the re-entrant opening 2 tends to apply force to the partition defined by the bell of the valve member 23, pushing the valve member 23 downwardly. The spots of solder 36 retain the valve members in position until the pressure within the region 33 falls to a predetermined limit. Then, in response to the pressure differential that exists across the partition defined by the bell 25 of the valve member 22, the solder will break, releasing the valve member and permitting the valve member to move. The valve member will then move freely. The valve member will also move in response to any subsequent change in pressure within the region 33 in the bottle which initially contains the compressed gas.

As the valve member 23 is moved downwardly, so the inturned lip 32 provided at the upper end of the tubular portion 30 of the valve member 23 becomes aligned with the grooves corresponding to the grooves 29 formed in the tube 8. This increases the cross-sectional area available for the flow of gas, thus gradually increasing the rate of flow of the gas.

Due to the high pressure of gas within the region 35 with the bottle, located between the partition defined by the bell 25 and the lower re-entrant opening 3, the valve member 24 (when the solder associated with that valve member breaks) moves upwardly, in the illustrated orientation. The inturned lip 28 thus moves past the recesses 29, increasing the cross-sectional area available for the flow of gas. Thus, again, the rate of flow of gas through the lower re-entrant opening 3 is initially restricted by the passage available between the free end of the inturned lip 28 and the exterior of the tube 8, and then increases due to the presence of the recesses 29 adjacent the lip 28 as both the tube 8 moves downwardly and the valve member 24 moves upwardly.

As the valve members 22, 23 continue to move towards each other, as more gas is withdrawn from the region 33, the parts of the valve members 22, 23 contained within the sealing rings 26, 31, become withdrawn from those sealing rings. Consequently, an air outlet passage is then defined which is substantially larger than the initial air outlet passage defined between the ends of the inturned lips 28, 32 and the exterior of the tube 8. This air passage allows gas initially in the regions 34 and 35 to be dispensed. It is preferred that the cross-sectional area of the passage then defined is approximately twenty times the cross-sectional area of the initial air passage defined between the ends of the inturned lips and the exterior of the tube 8. The compressed gas contained within the regions 34 and 35 may thus escape from the bottle through the enlarged outlet openings, providing a higher flow rate.

Figure 4:
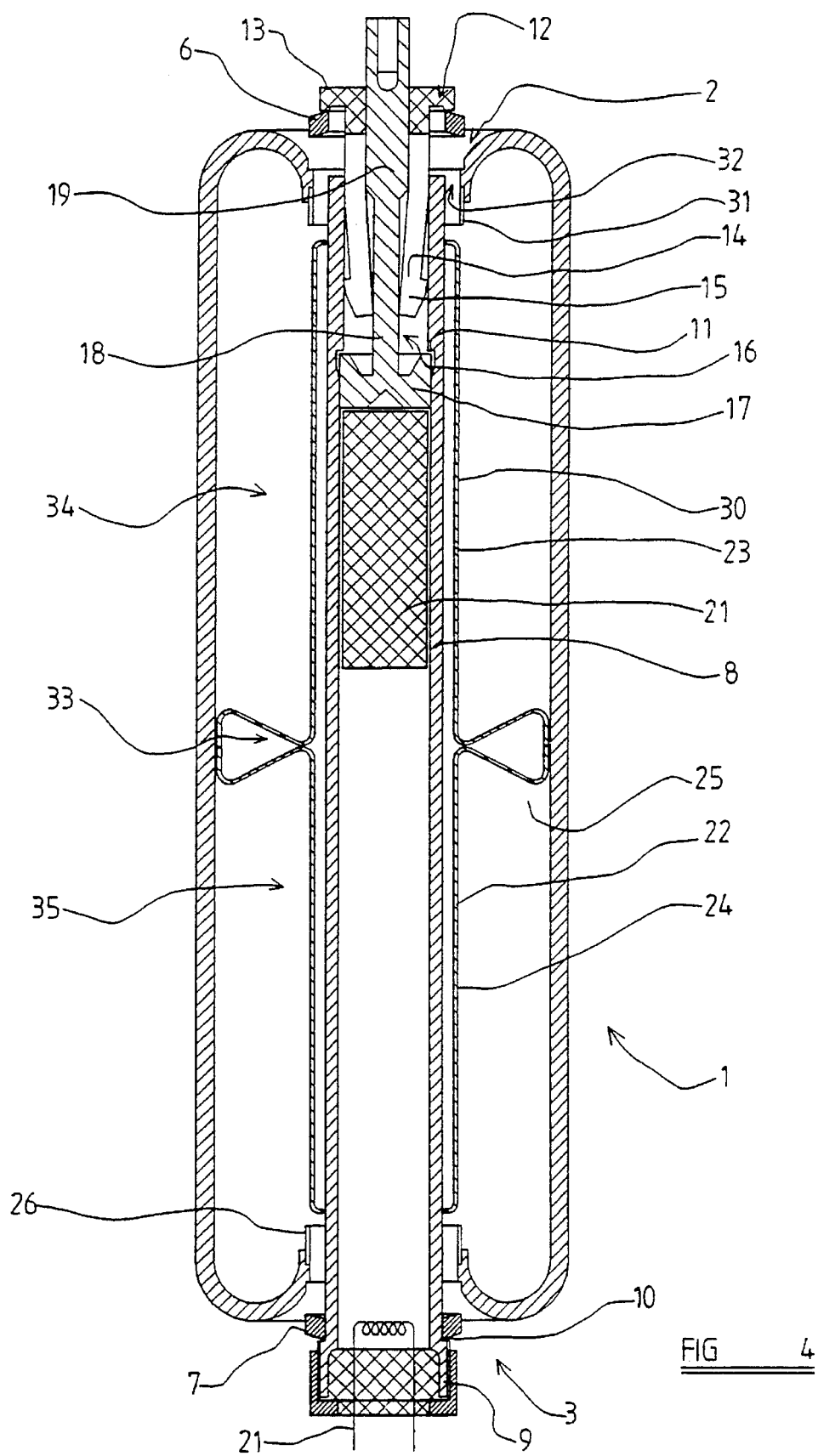
FIG. 4 is a view corresponding to FIG. 3 illustrating the arrangement after a further brief period of time.
Figure 5:
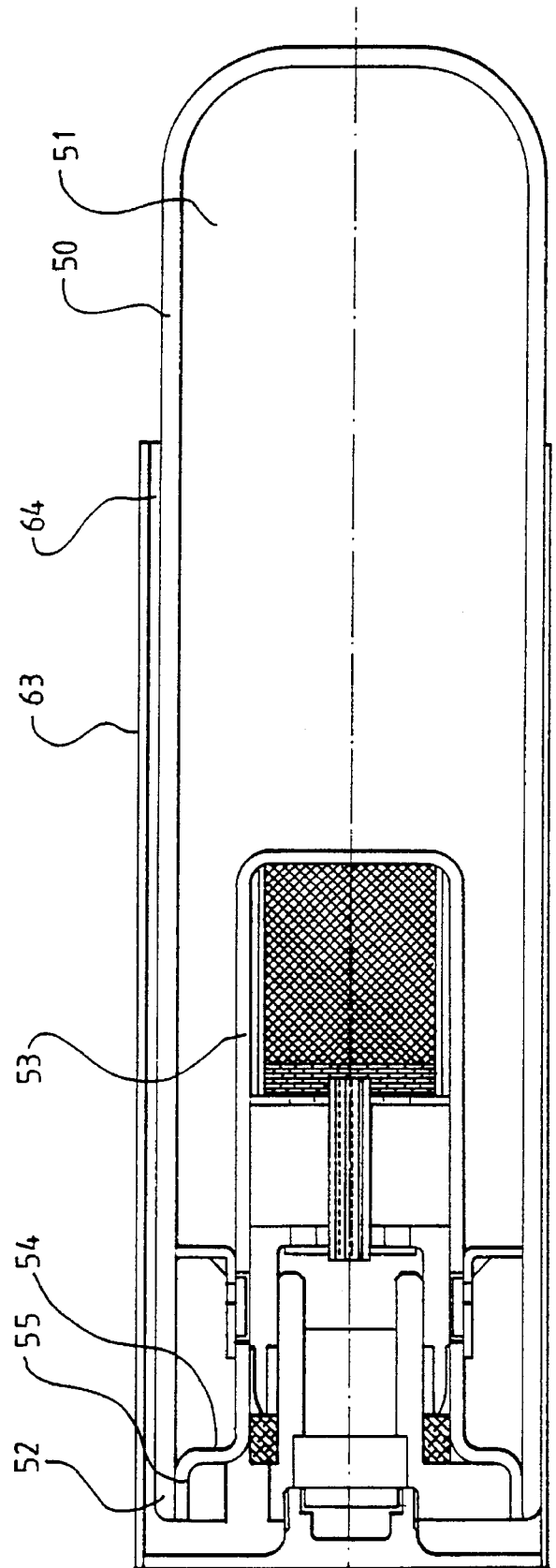
FIG. 5 is a sectional view illustrating another embodiment of a gas supply arrangement for use with an air-bag in an initial condition.

FIG. 3 illustrates the position shortly after activation of the pyrotechnic charge 20. That pyrotechnic charge is no longer visible since it has ignited, and it can be seen that the tube 8 is beginning to move downwardly. FIG. 4 illustrates the position shortly thereafter, when the valve members 22 and 23 have moved to their final positions, with the inturned lips 28 and 31 being totally withdrawn from the axially extending sealing rings 26 and 31.

It can be seen that, with reference to FIG. 4, the second pyrotechnic charge 21 is still in position within the tube 8. This is a slow-igniting pyrotechnic charge, and ignites when the bottle is in the fully opened position as illustrated in FIG. 4. Warm gas from the first pyrotechnic charge 20 and further warm gas from the second pyrotechnic charge 21 flow past the piston 16 to emerge through the lower end 3 of the bottle in the orientation illustrated, the warm gas mixing with the decompressed compressed gas initially present within the bottle 1. The temperature of compressed gas falls as the gas decompresses. Thus the decompressed compressed gas may have a relatively low temperature. This decompressed compressed gas is mixed with the warm gas from the pyrotechnic charge, thus providing a mixture of gas which has an appropriate moderate temperature. This ensures that the air-bag is inflated with optimum efficiency, whilst not effecting any damage to the interior of the air-bag. Also the gas from the pyrotechnic charges, which may be toxic or poisonous if in a concentrated form, is mixed with the compressed gas, which is most conveniently compressed air, thus diluting the gas from the pyrotechnic charges.

The combination of the sealing rings 6, 7 and the valve members 22, 23 comprises a valve mechanism which consists effectively of two valves in series. The sealing rings retain the gas-tight integrity of the bottle until release by the pyrotechnic charge, and the valves 22, 23 control the size of the flow path for gas leaving the bottle 1. The section of the flow path is increased in a controlled manner. The size of the flow path undergoes a sudden increase when the solder breaks, thus enabling the partly inflated air-bag to continue inflating at a more rapid rate. Means other than solder can be used to retain the valve members 22, 23 in a first position, but the means selected must be such that when the valve members are released, in response to the described drop in pressure in region 33, the valve members move relatively freely so that there is a relatively sudden increase in the size of the flow passage. Thus, instead of solder, use might be made of a breakable plastic element to retain the valve members in position, or some mechanism that initially retains the valve members and then releases them, in response to the threshold or limit being reached.

In a modified embodiment of the invention, instead of utilising a pyrotechnic charge to move the piston 17 associated with the rod 19, the rod 19 may be moved by electrical means, such as an electro-magnet. Such an embodiment still provides a simple and reliable method of sealing a bottle of compressed gas, but does not provide the advantage of warming the compressed gas, when it has expanded, with gas from a pyrotechnic charge.

It is to be appreciated that the second pyrotechnic charge 21 must be considered also to be an optional feature of the particularly described embodiment of the invention.

It is to be understood that the duration of the procedure described above, from the initiation of the first pyrotechnic charge 20, to the time when the valve members are moved such a distance that the inwardly turned lips 28 and 33 are withdrawn from the sealing rings 26 and 31 has a duration of at least 10 milliseconds, but preferably has a duration of at least 30 milliseconds.

Referring now to FIGS. 5 to 8 of the accompanying drawings, a second embodiment of the invention is illustrated.

This embodiment comprises a cylindrical gas bottle 50 which is closed at one end and which defines a hollow interior 51 which contains a compressed gas. The compressed gas may be compressed air or may be an inert gas such as argon or nitrogen, or a mixture of such inert gases. Preferably, however, the gas comprises at least some oxygen. The gas may have a pressure of approximately 200 bars.

The cylindrical gas bottle 50 has a closed end and an open end 52. Received within the open end 52 is a tubular housing 53 formed of an appropriate material, the tubular housing having, adjacent the open end of the bottle 52, an outwardly directed flange 54 carrying a terminal lip or rim 55 which is in substantially sealing-tight engagement with the interior of the open end 52 of the bottle.

A plug 56, having a terminal flange 57 and an axially extending hollow spigot 58 is inserted into the end of the tubular housing 53, the flange 57 of the plug 56 serving to force the lip or rim 55 of the housing 53 into firm engagement with the interior of the open end 52 of the gas bottle 50. The hollow spigot 58 contains a cylindrical insert 59, which comprises an electrically activated squib. The exterior of the insert 59 defines a seat 60 which receives a tubular projection 61 formed integrally with a cover 62, the cover comprising a disc-like portion which is spaced from the open end 3 of the bottle 1. The disc-like portion of the cover 62 carries a sleeve 63 which substantially surrounds part of the gas bottle 50, a passage 64 for combustion gases, as will be described hereinafter, being defined between the sleeve 63 and the exterior of the bottle 50.

A plurality of evenly spaced apertures or air passages 65 are formed in the flange 57 of the plug 56, communicating with the interior of the housing 4. An annular filter 66 is provided which surrounds the spigot 58 of the plug 56, engaging the exterior of the spigot 58 and the interior of the housing 53, the filter 66 being located in the flow passage which leads to the air passages 65. A cylindrical space 67 is formed between the housing 53 and the spigot 59 adjacent the filter 66.

Figure 6:
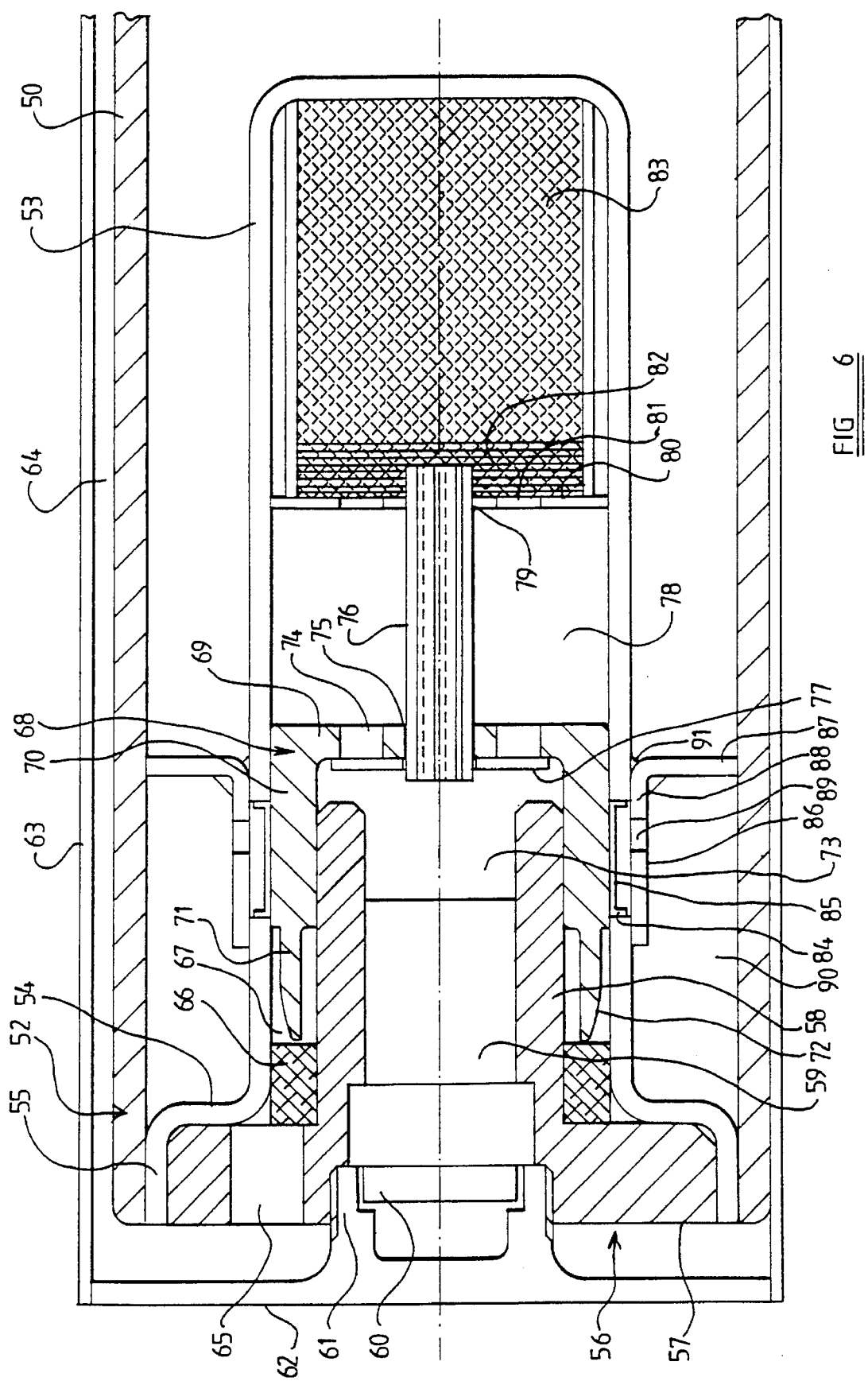
FIG. 6 is an enlarged view of part of FIG. 5.

A piston 68 is mounted for axial sliding movement within the housing 53. The piston 68 comprises a disc-like part 69 which is a substantially sealing sliding fit within the cylindrical interior of the cylindrical housing 53. The disc-like part 69 carries a rearwardly extending tubular flange 70 having an external diameter which is substantially equal to the internal diameter of the housing 53. The flange 70 extends towards the left as illustrated in FIG. 6. The interior of the flange 70 slidingly engages the spigot 58. The flange 70 terminates with a rearwardly extending projection 71. The projection 71 has a greater internal diameter than the internal diameter of the main rearwardly extending flange 70 and a lesser external diameter than the external diameter of the main rearwardly extending flange 70. Thus, the rearwardly extending projection 71, although it comprises a flange of substantially the same overall diameter as the flange 70, is stepped inwardly both from the exterior and from the interior of the flange 70. The terminal external region of the projection 71 is tapered inwardly, as shown at 72 in FIG. 5.

A space 73 is defined between the insert 59 and the disc 69 forming the operative part of the piston 68.

The disc 69 forming the operative part of the piston 68 is provided with a plurality of evenly spaced through-apertures 74. A centrally located aperture 75 is provided through which extends a fuse 76. An annular plate 77 is provided located within the space 73 abutting the rear face of the disc 69 that forms the operative part of the piston 68. The central aperture in the annular plate 77 surrounds part of the fuse 76 which extends through the annular plate 77, and the annular plate 77 effectively seals the through-apertures 74 formed in the disc 69 that forms the operative part of the piston 68.

A space 78 is defined in front of the piston 68, and the fuse 76 extends across the space 78. The fuse passes through a central aperture 79 formed in a partition 80 which extends across the interior of the housing 53. The partition 80 is provided with a plurality of through-apertures 81 substantially aligned with the apertures 74 formed in the disc 69 of the piston 68.

A filter material 83 is located adjacent the apertures 81 and a pyrotechnic material 83 adjacent the filter material.

A plurality of apertures 84 are provided in the inner housing 53 in the region of the flange 70 provided on the piston 68, when the piston 68 is in the initial position as illustrated. Each aperture 84 is sealed initially by a sealing disc 85. Each sealing disc 85 is a thin steel disc, approximately 0.25 mm thick. Each disc is welded or soldered in position. The inner surface of each disc 85 is substantially flush with the interior of the housing 53. Thus each disc is supported by the exterior part of the rearwardly extending flange 70 forming part of the piston 68, when the piston 68 is in the position illustrated in FIG. 5.

A slide 86 which acts as a valve member is provided which is of annular form and which surrounds the inner housing 53. The slide 86 presents a substantially radially outwardly directed annular flange 87 which extends from the housing 53 to the interior of the gas bottle 50. The slide 86 further incorporates a tubular portion 88 which effectively surrounds the housing 53, the portion 88 defining a plurality of relatively small through-apertures 89, which, in an initial position at the slide 86 are substantially aligned with the apertures 84 formed in the inner housing 53. The flange 87 defines a region 90 of the interior of the gas bottle 50 which is located between the radially extending flange 89 formed on the slide 86, and the outwardly directed flange 54 formed on the inner housing 53. The slide 86 may be initially soldered into position with one or two small spots of solder.

The illustrated gas generator is adapted to be activated in response to a signal from a sensor, the sensor being adapted to provide the signal in response to deceleration in excess of a predetermined limit or a collision. The signal ignites the squib 59. The squib 59, when ignited, generates gas which is supplied to the space 73 between the squib 59 and the piston 68. Because the disc 77 effectively seals the apertures 74 formed in the disc 69 forming the operative part of the piston 68, the space 73 is substantially sealed, and the increase in pressure caused when gas is supplied from the squib to that place causes the piston to move towards the right as shown in FIG. 6.

As the piston moves towards the right the projection 71 which is substantially aligned with the flange 70 is brought into alignment with the apertures 84. The discs 85 can thus no longer rest on the exterior of the flange 70. Compressed gas within the region 90 passes through the relatively small aperture 88 and exerts pressure on the sealing discs 85. The sealing discs break and move inwardly. Each disc may be considered to be a valve that is initially gas-tight, and that is opened, by actuation of a pyrotechnic change, to initiate the discharge of gas from the bottle of compressed gas.

The sealing discs may each open in the manner of a door, particularly if the forward edge of each sealing disc is secured rather more firmly to the inner housing 53 than the trailing edge of each sealing disc. As the piston 68 continues to move forwardly each disc initially opens in a gradual manner, with the disc engaging the exterior of the rearwardly extending projection 71, but as the piston continues to move forwardly each disc moves gradually down the tapered portion 72 of the rearwardly extending projection 71, the disc thus opening in a gradual and controlled manner, until, as shown in FIG. 7, each disc is fully open.

When each disc 85 opens compressed gas from the region 90 flows through the aperture 89 in the slide 86 and through the opening 84 through the space 67 and thus through the filter 66, the gas thus passing through the flow passages 65 and along the flow path 64 defined between the outer sleeve 63 and the exterior of the gas bottle 50, the gas thus commencing the inflation of the air bag.

Since gas from within the region 90 within the interior of the gas bottle 50 is escaping, the pressure within that region will drop. Consequently the pressure applied to the forward side of the annual flange 89 present on the slide 86 will eventually exceed the pressure applied to the rearward face of that flange, and, when a predetermined threshold or link has been reached, the solder 91 retaining the slide 86 in position will break, and the slide will move rearwardly, that is to say towards the left. Thus gas will then be able to flow instead of through the relatively small apertures 89 formed in the tubular part 88 of the slide 86, through the entire open area of the apertures 84 from the hollow interior 51 of the gas bottle 50. Thus the rate of flow of gas suddenly increases. It will be understood that the slide 86 comprises a valve member, which moves in response to a change in pressure in the region 90 within the bottle containing compressed gas to establish a flow path from the main region 51 of the interior of the gas bottle 50.

The activation of the squib will have ignited the fuse 76. The fuse 76 burns for a predetermined period of time and then ignites the pyrotechnic material 83.

When the pyrotechnic material 83 is ignited, combustion gas flows through the filter 82 and through the apertures 81 formed in the partition 80. By this time the piston 68 has moved to the position illustrated in FIG. 7 in which the front face of the disc 69 is abutting the partition 80. The through-apertures 74 formed in the piston are aligned with the through-apertures 81 formed in the partition 80. Combustion gas from the pyrotechnic material 83 can thus flow through the apertures 74. The pressure of combustion gas exceeds the pressure within the space 73 behind the piston, and thus the combustion gas moves the disc 77 towards the left. The disc moves until it engages the end of the inwardly directed spigot 58. Combustion gas can then flow between the rearwardly extending projection 71 provided on the annular flange 70 and the free end of the spigot 58, the combustion gas thus flowing into the space 67 and mixing with compressed gas flowing from the interior 51 of the gas bottle 50. If the gas contained within the interior 51 of the gas bottle 50 is air or other oxygen-containing gas, then the combustion gas of the pyrotechnic material may be further oxidized when the combustion product of the pyrotechnic material is mixed, in the region 67, with the gas from the interior of the gas bottle 50.

The filter 66 may help ensure that the pressure within the region 67 is an appropriate pressure for such a combustion process, by providing a certain back pressure. The filter 66 also provides a heat exchanger effect, ensuring uniform heating of the gases passing through the filter and flowing out of the gas generator through the gas flow passages 65.

It is to be appreciated that in operation of the gas generator of FIGS. 5 to 8 initially gas within the space 90 partially inflates the air-bag, and subsequently compressed gas, which is heated by the combustion products of the pyrotechnic material 83 completes the inflation of the air bag. The period of time to fully open the valve has a duration of at least 10 milliseconds and may have a duration of at least 30 milliseconds.

Whilst, in the embodiment described with reference to FIGS. 5 to 8, a piston is described which moves in response to ignition of a squib, it is to be appreciated that in an alternative embodiment the piston may be replaced by any movable element, the movable element being biassed initially by a spring, but being retained in an initial position by a triggering means which, on activation, releases the movable element so that the movable element can then move under the bias applied to it by the spring. Also it is to be appreciated that whilst in the description of the embodiment of FIGS. 5 to 8 reference is made to solder retaining the slide in position, the slide could initially be retained by other frangible means, such as a plastic material element, or a mechanism adapted to release the slide when the predetermined threshold or limit is reached.

We claim:

1. A gas supply device for supplying gas to an airbag, the gas supply device comprising a bottle containing compressed gas and a valve mechanism operable to permit the compressed gas to flow from the bottle to inflate the airbag, the valve mechanism comprising a valve member which is movable in response to a change in pressure in a specific region within the bottle to increase, in a controlled manner, the flow passage area for gas flowing from the bottle, retaining means being provided to retain the valve member in a first position until the change in pressure reaches a predetermined limit, the retaining means then releasing the valve member to permit the valve member to move wherein the bottle containing compressed gas defines at least two regions separated by a partition wall, the partition wall being movable in response to a fall in pressure in one of the two regions, the valve member moving in response to movement of the partition wall.

2. A gas supply device according to claim 1 wherein the retaining means comprise frangible means.

3. A gas supply device according to claim 1 wherein the frangible means comprise solder which initially retains the valve member in the first position.

4. A valve mechanism according to claim 1 wherein the valve member forms a first valve which controls the rate of flow of gas, there being a further valve in series with the first valve, the further valve initially being gas-tight, and being operable to initiate the flow of gas from the bottle.

5. A gas supply device according to claim 4 wherein the further valve is opened by actuation of a pyrotechnic charge.

6. A gas supply device according to claim 4 wherein the further valve is opened by means of an electro-magnetic arrangement.

7. A gas supply device according to claim 4 wherein the further valve comprises a sealing means adapted to seal the bottle containing the compressed gas, the sealing means being provided with one or more locking elements each adapted to engage an abutment to retain the sealing means in the sealing position, there being a further locking element, adjacent said at least one or more locking element, to retain the at least one locking element in position in engagement with the abutment, means being provided to move the further looking element when the device is operated, thus enabling the said one or more looking elements to become disengaged from the abutment to release the sealing means to open the further valve.

8. A gas supply device according to claim 1 wherein the valve mechanism is such that gas from one of the two regions is dispensed before gas from the other region is dispensed.

9. A gas supply device according to claim 1 wherein the partition wall is formed integrally with the movable valve member.

10. A gas supply device according to claim 1 wherein the valve mechanism is such that gas from one of the regions is dispensed before gas from the other region is dispensed.

11. A gas supply device according to claim 1 wherein the cross-section of the flow area of the valve when fully opened is approximately twenty times larger than the cross-section of the flow area of the valve when the valve mechanism is initially opened.

12. A gas supply device according to claim 1 wherein the flow passage area gradually increases with the movement of the movable valve member.

13. A gas supply device according to claim 12 wherein the movable valve member moves past a series of grooves, enabling the grooves to become part of the flew path, thus increasing the cross-sectional area of the flow path.

14. A gas supply device according to claim 4 wherein the further valve comprises a sealing ring initially retained in position engaging a seat, the further valve being opened by removing the sealing ring from the seat.

15. A gas supply device according to claim 1 wherein the movable valve member comprises a tubular portion surrounding a tube, means being provided to constrain gas from the bottle to flow between the tubular portion and the tube, the tubular portion terminating with an inturned lip defining a leaky valve, the tubular portion being received slidingly within a sealing ring and being adapted to be removed from the sealing ring to fully open the valve mechanism.

16. A gas supply device according to claim 1 wherein, in operation, the period of time necessary to fully open the valve mechanism has a duration of at least 10 milliseconds.

17. A gas supply device according to claim 1 wherein, in operation, the period of time necessary to open the valve fully has a duration of at least approximately 30 milliseconds.

18. A gas supply device according to claim 8 wherein the partition wall is formed integrally with the movable valve member.

* * * * *